United States Patent [19]

Iio

[11] Patent Number: 4,579,204
[45] Date of Patent: Apr. 1, 1986

[54] SHIFT MECHANISM FOR MARINE PROPELLING UNIT

[75] Inventor: Takeshi Iio, Hamamatsu, Japan

[73] Assignees: Yamaha Hatsudoki Kabushiki Kaisha; Sanshin Kogyo Kabushiki Kaisha, both of Japan

[21] Appl. No.: 317,348

[22] Filed: Nov. 2, 1981

[30] Foreign Application Priority Data

Nov. 13, 1980 [JP] Japan ................. 55-160033

[51] Int. Cl.⁴ .............................. F16D 21/04
[52] U.S. Cl. ................. 192/21; 192/89 QT; 192/93 R; 192/109 A
[58] Field of Search ............ 192/67 R, 93 R, 20, 192/21, 96, 51, 89 QT, 109 A

[56] References Cited

U.S. PATENT DOCUMENTS 3,919,964 11/1975 Hagen .
4,223,773 9/1980 Croisant et al. ............. 192/93 R Primary Examiner—George H. Krizmanich
Attorney, Agent, or Firm—Ernest A. Beutler

[57] ABSTRACT

An improved shifting mechanism for the outboard drive unit of a marine propulsion device. The unit includes a torsion bar actuator that resiliently deflects until a detent on the shifting sleeve is released. Upon release of the detent, the torsional loading on the torsion bar is released so as to slap the clutch elements into engagement.

11 Claims, 6 Drawing Figures

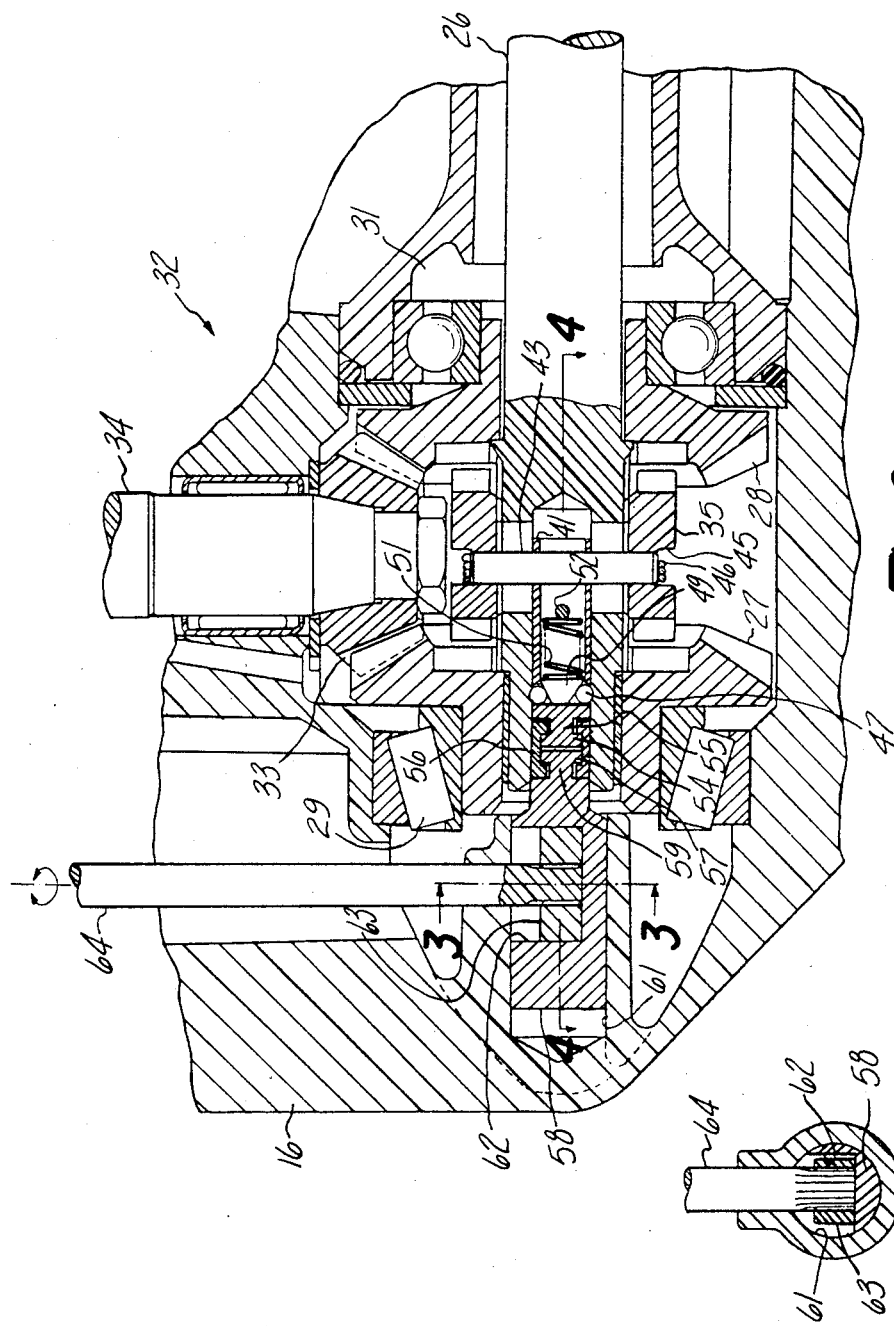

SHIFT MECHANISM FOR MARINE PROPELLING UNIT

BACKGROUND OF THE INVENTION

This invention relates to an improved shifting mechanism for coupling a driving mechanism to a driven mechanism and more particularly to such a shifting mechanism that is particularly adaptable for utilization in the shifting arrangement of an outboard engine or propelling unit of an inboard/outboard drive.

Many types of shifting mechanisms employ dog or positive clutches for coupling a driving member to a driven member. A typical example of such an application is in the transmission mechanism of an outboard engine or inboard/outboard drive. In conjunction with such arrangements, there are a pair of gears rotatably supported on the output shaft and which rotate in opposite directions. A shifting mechanism including a sliding sleeve having positive clutching elements is mounted between these gears and is shiftable into engagement with corresponding clutching mechanism on the gears for coupling the sleeve to the output shaft which drives the propeller. With such an arrangement, of course, it is important that the sleeve be brought quickly and positively into engagement with the respective gear so as to avoid the chattering which occurs if the engagement is not rapid and accurate. In addition to the noise, such chattering of course will cause wear in the system. In order to avoid these problems, it has been proposed to provide some form of positive assist such as a fluid motor to affect the shifting mechanism. Alternatively, it has been proposed to employ a spring arrangement which will provide a constant force for urging the clutch element into engagement. Both arrangements are, obviously, expensive and significantly complicate the shifting mechanism.

It is, therefore, a principal object of this invention to provide an improved and simplified shifting mechanism.

It is another object of this invention to provide an improved shifting mechanism wherein positive clutch elements are brought into engagement with a uniform force.

It is yet a further object of this invention to provide an improved and simplified shifting mechanism for an outboard drive unit.

SUMMARY OF THE INVENTION

A first feature of this invention is adapted to be embodied in a shifting mechanism for coupling a driving mechanism to a driven mechanism. The shifting mechanism includes a pair of relatively movable positive clutching elements each operatively coupled for rotation with a respective one of the mechanisms. The clutching elements are relatively movable between an engaged position and a disengaged position. Detent means are provided for restraining the clutching elements in their disengaged position and the detent means is biased to require a predetermined force to release it for relative movement of the clutching elements to their engaged position. Actuating means moves the clutching elements relative to each other between their engaged and disengaged positions. In accordance with this feature of the invention, the actuating means includes an element having a first end portion that is adapted to be moved by an operator for actuating the clutching elements, a second end part cooperable with the clutching elements for the relative movement and a resilient intermediate portion. The intermediate portion is sufficiently resilient for permitting relative rotation of the first and second ends upon the operation of the first end by an operator until the predetermined force required to release the detent means is exceeded for release of the resilient force stored in the intermediate portion due to its relative rotation upon the release of the detent means for providing a spring force for driving the clutch elements into engagement.

As a further feature of this invention, the shifting mechanism is adapted to be employed in the final drive unit of an outboard drive having a pair of oppositely rotating gears rotatably supported on an output shaft. The one clutching element consists of a sleeve that is rotatably coupled to the output shaft and which is slidably supported thereupon between the gears. Opposite ends of the sleeve have clutching elements as described which cooperate with clutching elements formed on the gears.

BRIEF DESCRIPTION OF THE DRAWINGS

FIG. 2 is an enlarged cross-sectional view of the final drive unit of the motor shown in FIG. 1 and illustrates the clutching mechanism in a neutral position.

FIG. 3 is a cross-sectional view taken along the line 3—3 of FIG. 2.

DETAILED DESCRIPTION OF THE PREFERRED EMBODIMENT

Figure 1:
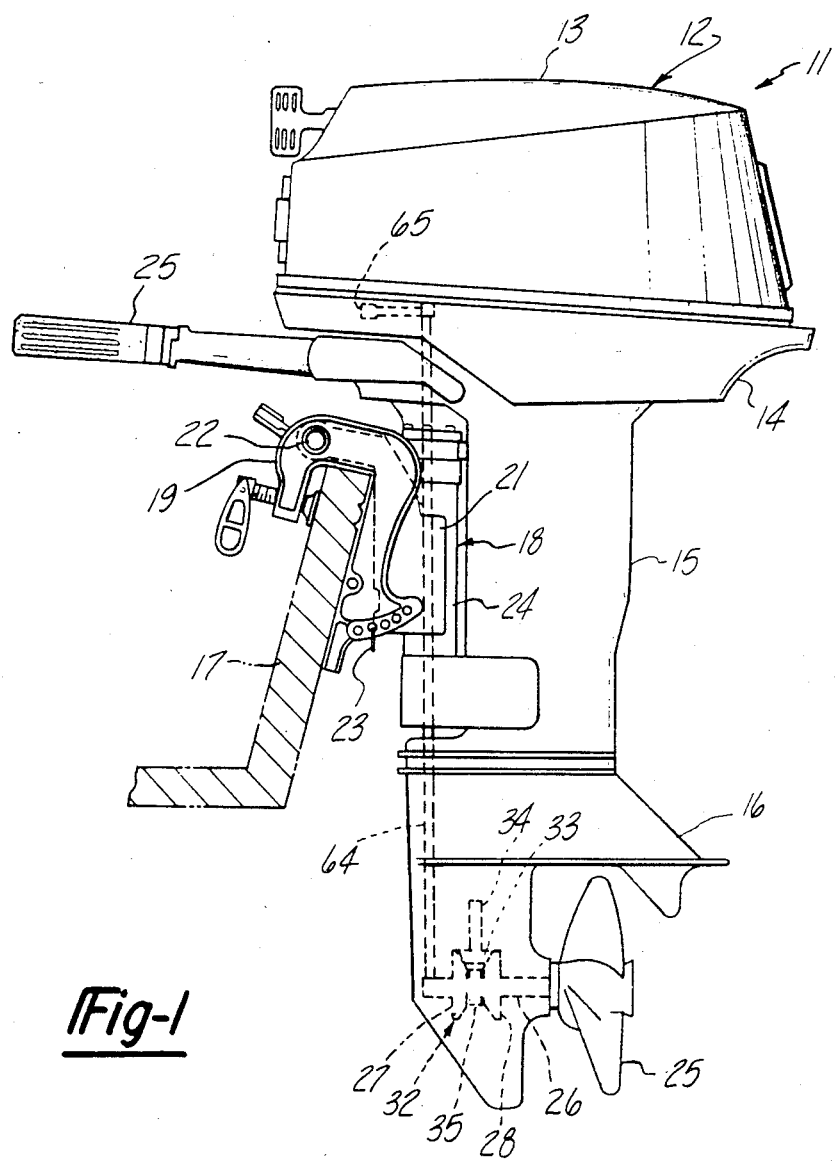
FIG. 1 is a side elevational view of an outboard motor unit embodying a shift mechanism constructed in accordance with this invention.

In the drawings the reference numeral 11 indicates generally an outboard motor embodying a shift mechanism constructed in accordance with this invention. Although an outboard motor is illustrated and described, it is to be understood that the invention has equal utility with the outboard drive unit of an inboard/outboard drive arrangement and, in fact, certain features of this shifting mechanism may find utility an application in still other driving arrangements.

The outboard motor 11 includes a power head, indicated generally by the reference numeral 12 and which is enclosed by upper and lower pieces 13 and 14 of a protective cowling. A drive shaft housing 15 depends from the power head 12 and contains a drive shaft, to be described, which drives the lower unit 16. The motor 11 is mounted on a transom 17 of an associated boat which is shown in phantom by means of a supporting arrangement, indicated generally by the reference numeral 18. The supporting arrangement includes a first bracket 19 that is fixed in a known manner to the transom 17. A second bracket 21 is supported by the bracket 19 for pivotal movement about a generally horizontally extending pivot axis by means of a pivot pin 22. Pivotal movement of the bracket 21 relative to the bracket 19 about the pivot axis 22 permits the motor 11 to be adjusted for trim, the position being determined by a trim adjusting arrangement 23 of a known type as well as to be lifted clear of the water when the motor 11 is not in use. A housing 24 is pivotally supported by the bracket 21 so as to permit motor rotary movement of the motor 11 about a generally vertically extending axis for steering operation. A tiller or handle 20 is affixed to the upper portion of the drive shaft housing 15 so as to permit such steering movement.

The lower unit 16 includes a propeller 25 that is fixed to the driven output shaft 26 by means of some form of releasable coupling such as a shear pin or the like (not shown) as is conventional in this art. As may be seen in FIG. 2, a forward bevel gear 27 and rearward bevel gear 28 are journaled on the output or driven shaft 26. The gears 27 and 28 and, accordingly, the shaft 26 are rotatably supported in the lower unit 16 by means of a roller-type thrust bearing 29 and by means of a ball bearing 31. A shift mechanism, indicated generally by the reference numeral 32, is provided for selectively coupling either of the gears 27 or 28 to the output shaft 26 for rotating the propeller 25 in either the forward or reverse direction. In addition, the shift mechanism 32 provides a neutral position so that the power head 12 may drive without causing rotation of the propeller 25. The gears 27 and 28, which incidentally are of the bevel type, are enmeshed with a driving gear 33 also of the bevel type which is affixed in a known manner to the lower end of the drive shaft 34. It should be readily apparent that rotation of the drive shaft 34 will cause the bevel driven gears 27 and 28 to rotate in opposite directions.

The shift mechanism 32 includes a sleeve 35 which is keyed for rotation with the output shaft 26 but which is axially slidable along this shaft between the gears 27 and 28. The sleeve 35 is formed with oppositely facing, positive clutching elements 36 and 37 that are adapted to cooperate with corresponding clutching elements 38 and 39 formed on the gears 27 and 28 radially inwardly of their teeth. When the clutch teeth 36 and 38 are in engagement, the drive will be in a forward direction and when the teeth 37 and 39 are in engagement, the drive will be in a reverse direction. When none of these teeth 36 through 39 are in engagement, the engine will be operating in a neutral condition.

In order to axially shift the sleeve 35 between its neutral position (FIGS. 2 and 4), its forward drive position (FIG. 5) and its reverse drive position (FIG. 6), an actuating element of generally cylindrical configuration 41 is slidably supported in a bore 42 formed at one end of the output shaft 26. The actuating element 41 is coupled to the sleeve 35 by means of a pin 43 that extends through a pair of elongated slots 44 formed in the output shaft 26. The pin 43 is received in aligned openings formed in the sleeve 35 adjacent a recess 45 that is formed in the sleeve 35. The pin 43 is axially held in position by means of a spring retainer 46.

The sleeve 35 and actuating element 41 are normally maintained in a neutral position by means of a detent mechanism comprising a plurality of balls 47 that are positioned in cooperating apertures of the actuating element 41 and which are urged into engagement with a recess 48 formed in the output shaft 26. The balls 47 are so urged by means of a plunger member 49 that is biased by a compression spring 51 which is loaded between the plunger member 49 and a pin 52 that is staked to the actuator 41. The spring 51 and plunger member 49 exerts a predetermined bias on the balls 47 so that a predetermined force must be exerted before the actuator 41 and sleeve 35 may move from their neutral positions.

To the left of the detent mechanism as seen in FIGS. 2 and 4 through 6 and immediately to the left of the balls 47, the actuator 41 is formed with a headed portion 54 of smaller diameter than the bore 42 and which has a circumferential recess 55 formed therein. A split coupling member 56 couples the actuator headed portion 54 to a corresponding headed portion 57 of an actuating member 58. The actuating member headed portion 57 also has a circumferential recess 59 with which the coupling member 56 cooperates so as to fix the actuating member 58 with the actuating element 41.

The actuating member 58 has a generally cylindrical configuration and is slidably supported in a bore 61 formed in the lower unit 16. The actuating member 58 has a generally V-shaped recess 62 with curved sides in which an operating cam 63 is positioned. The operating cam 63 is affixed by means of a spline connection to one end of an operating shaft 64. The operating shaft 64 is long and, as will be described, sufficiently resilient to operate as a torsion bar. The operating shaft 64 extends upwardly through the lower unit 16 and drive shaft housing 15. The operating member 64 terminates adjacent the power head 12 and specifically is accessible at the underside of the forwardmost portion of the lower tray 14. A shifting lever 65 is affixed to the upper end of the operating shaft 64. If desired, the operating shaft 64 may be rotatably supported at one or more locations along its length.

Figure 4:
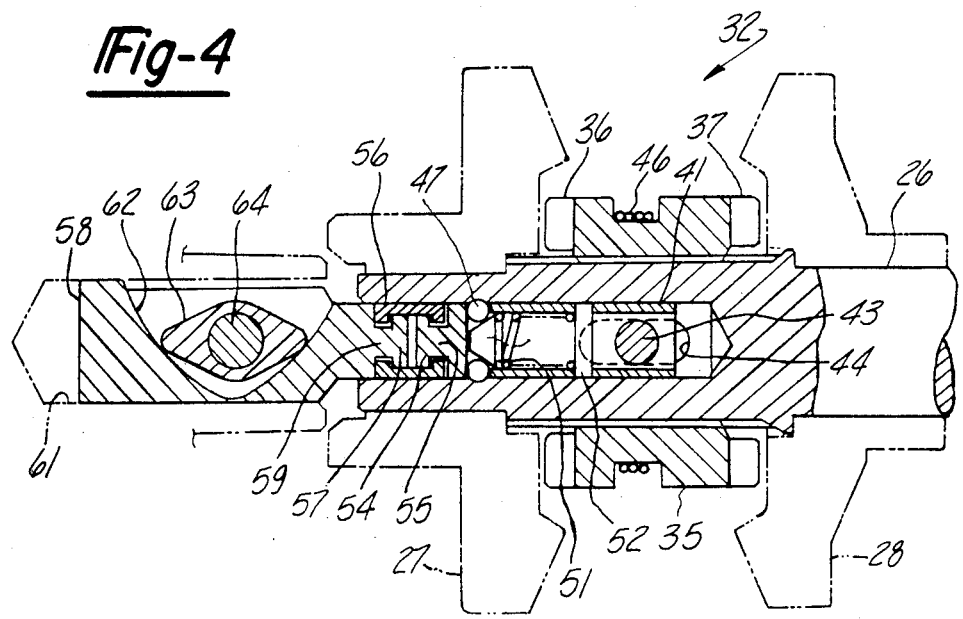
FIG. 4 is a cross-sectional view taken along the line 4—4 of FIG. 2.
Figure 5:
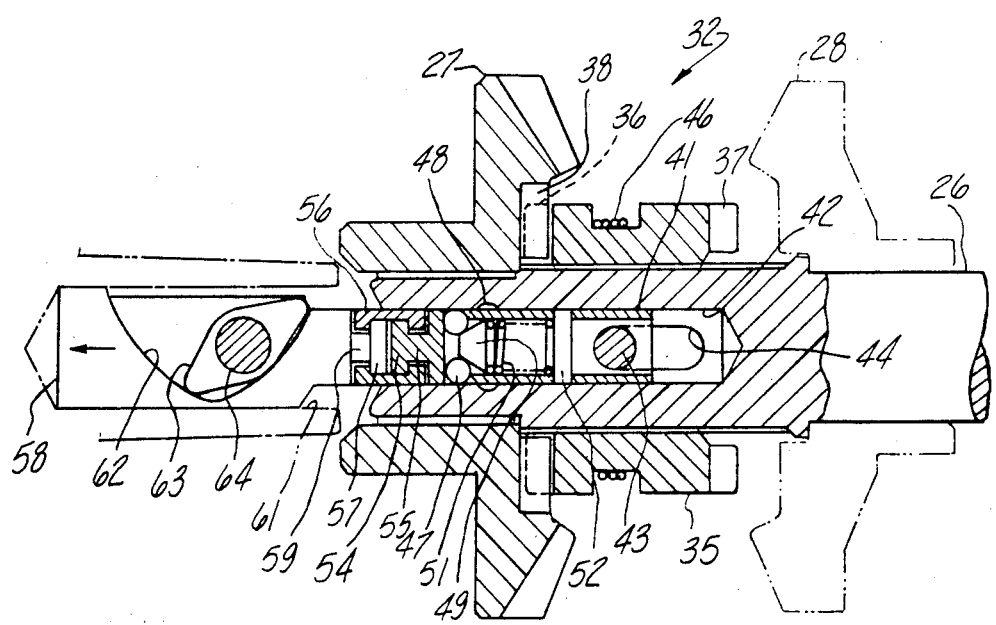
FIG. 5 is a cross-sectional view, in part similar to FIG. 4, showing the clutching mechanism engaged in the forward drive position.

FIGS. 2 and 4 show the shifting mechanism as it appears in the neutral condition. In this condition, the sleeve 35 is retained in its neutral location by means of the detent mechanism consisting of the balls 47 and recess 48. Neither of its clutch teeth 36 or 37 will be in engagement with the corresponding clutch teeth 38 or 39 of the bevel gears 27 and 28. Thus, even though the engine may be operating and the gears 27 and 28 rotating in opposite direction, the output shaft 26 will not be driven. If it is desired to shift the mechanism into forward drive, the shift lever 65 is rotated so as to rotate the operating shaft 64 in a counter-clockwise direction as viewed in FIGS. 4 through 6. The initial phase of such rotation of the shift lever 65 will not result in any rotation of the cam 63 because of the action of the spring biased ball detents 47 which tend to retain the actuating element 41 in the neutral position. Since the groove 62 is inclined, there will be some mechanical resistance also to rotation of the cam 63. Hence, the operating shaft 64 will wind up or twist in its intermediate portions like a torsion bar. That is, there will be relative rotation of the shift lever 65 relative to the cam 63. Once sufficient spring force has been stored in the intermediate portion of the operating shaft 64 so as to overcome the bias on the ball detents 47, the ball detent 47 will be urged inwardly against the action of the plunger 49 and spring 51. The stored resilient energy in the operating shaft 64 will then be released to drive the operating member 58 to the left and, accordingly, move the actuating element 41 in the same direction. The pin 43 will transmit this motion to the sleeve 35 so as to snap its teeth 36 into engagement with the clutch teeth 38 of the gear 27. The force accomplishing this will be uniform since it will be that which was stored in the operating member 64 at an amount which exceeded the biasing on the balls 47. Shifting will thus be accomplished smoothly and without chatter.

It should be readily apparent that return of the sleeve 35 to its neutral position is accomplished by rotation of the operating shaft 64 and cam 63 in the clockwise direction. There will be no snap action under these circumstances since the ball detents 47 will not be engaged with any recesses. When the sleeve 35 reaches a neutral position, however, the balls 47 will again be urged into the recess 48 so as to hold the sleeve 35 in the neutral position.

Figure 6:
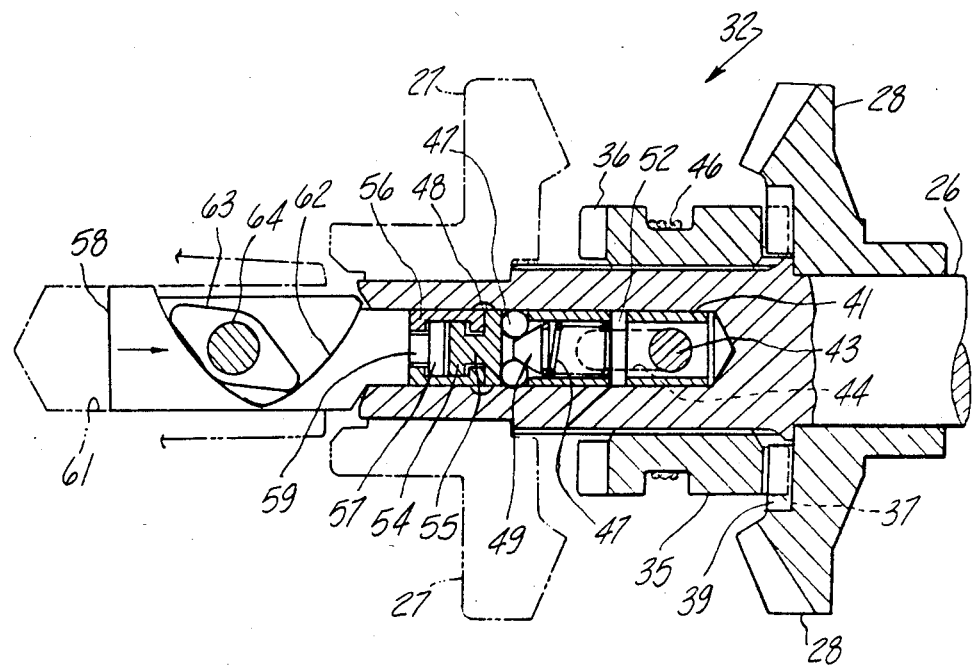
FIG. 6 is a cross-sectional view, in part similar to FIGS. 4 and 5, showing the clutching mechanism engaged in its reverse drive position.

It should be readily apparent that the torsional operating member 64 and ball detents 47 will operate in a manner similar to that described when shifting into the reverse condition (FIG. 6). That is, torsional energy will be stored in the operating member 64 until the spring bias on the ball detents 47 is exceeded. At that time, the sleeve 35 will be snapped to the right so that the teeth 37 engage the teeth 39 and drive the output shaft 26 in the reverse direction. Again, the force of engagement is predetermined as that necessary to release the ball detents 47.

It should be readily apparent from the foregoing description that a very simple and yet highly effective arrangement is employed for insuring a constant engagement force of the dog clutches of the shifting mechanism. This is accomplished without the complication of adding additional springs to the system or without necessitating power assist. As has been previously noted, this invention may be employed in conjunction with the outboard drive unit of an inboard/outboard drive in addition to an outboard motor as in the illustrated embodiment. Various other modifications may be made without departing from the spirit and scope of the invention, as defined by the appended claims.

I claim:

1. In a shifting mechanism for coupling a driving mechanism to a driven mechanism comprising a pair of relatively movable positive clutching elements each operatively connected for rotation with a respective one of said mechanisms, said clutching elements being relatively movable between an engaged position and a disengaged position, detent means for restraining said clutching elements in their disengaged positions, said detent means being biased for requiring a predetermined force to release said detent means for relative movement of said clutching elements to their engaged position, and actuating means for moving said clutching elements relative to each other between their engaged and disengaged positions, the improvement comprising said actuating means including an element having a first end portion adapted to be moved by an operator for actuating said clutching elements, a second end portion cooperable with said clutching elements for their relative movement and a resilient intermediate portion, said intermediate portion being sufficiently resilient for relative rotation of said first and second ends upon operation of said first end by an operator until the predetermined force required to release said detent means is exceeded for release of the resilient force stored in said intermediate portion upon release of said detent means for providing a spring force for driving said clutching elements into engagement.

2. A shifting mechanism as set forth in claim 1 wherein further including a third positive clutching element, said second clutching element being selectively movable into engagement with either of said first or said third clutching elements, said actuating means being operative to move said second clutching element into clutching engagement with either of said first and third clutching elements, said detent means being operative to hold said second clutching element in a neutral disengaged position between engagement with either of said first and third clutching elements.

3. A shifting mechanism as set forth in claim 2 wherein the second clutching element is supported for axial movement and is disposed between the first and third clutching elements.

4. A shifting mechanism as set forth in claim 3 wherein the second clutching element is slidably supported upon an output shaft which comprises the driven mechanism and is keyed for rotation with said output shaft.

5. A shifting mechanism as set forth in claim 4 wherein the detent mechanism is operative between the sleeve and the output shaft.

6. A shifting mechanism as set forth in claim 5 wherein the actuating means comprises a torsion bar.

7. A shifting mechanism as set forth in claim 6 wherein the torsion bar carries a cam at its second end which is operatively connected to a corresponding V-shaped groove of an operating element operatively connected to said sleeve.

8. A shifting mechanism as set forth in claim 1 wherein the actuating means element comprises a torsion bar.

9. A shifting mechanism as set forth in claim 8 wherein the second end portion of the torsion bar carries a cam operatively connected to the clutching elements for effecting the movement between their relative positions.

10. A shifting mechanism having an output shaft, a pair of bevel gears rotatably supported at spaced location upon said output shaft and being driven in opposite directions, a sleeve slidably supported upon said output shaft and coupled for rotation therewith between said gears, opposite ends of said sleeve and said gears having respective clutching elements, said sleeve being axially movable upon said output shaft between a neutral position, a forward drive position wherein said clutching elements of said sleeve are engaged with the corresponding clutching elements of one of said gears and a reverse position wherein the clutching elements at the other end of said sleeve are operatively engaged with the clutching elements of the other of said gears, and actuating means for moving said sleeve between its neutral position and its forward drive position and its reverse position, the improvement comprising said actuating means including an element having a first end portion adapted to moving said sleeve between its neutral position and its forward drive position and its reverse position, the improvement comprising said actuating means including an element having a first end portion adapted to be moved by an operator for actuating said sleeve, a second end portion cooperable with said sleeve for moving said sleeve and a resilient intermediate portion, detent means for restraining said sleeve in its neutral position, said detent means being biased for requiring a predetermined force to release said detent means for relative movement of said sleeve from its neutral position, said intermediate portion being sufficiently resilient for relative rotation of said first and second ends upon actuation of said first end by an operator until the predetermined force required to release said detent means is exceeded for release of the resilient force stored in said intermediate portion upon release of said detent means for providing a spring force for driving said sleeve into engagement with either of said gears.

11. A shifting mechanism as set forth in claim 10 wherein the element comprises a torsion bar.

* * * * *

UNITED STATES PATENT AND TRADEMARK OFFICE
CERTIFICATE OF CORRECTION

PATENT NO. : 4,579,204

DATED : April 1, 1986

INVENTOR(S) : Takeshi Iio

It is certified that error appears in the above-identified patent and that said Letters Patent is hereby corrected as shown below:

Column 6, lines 47-51, (Claim 10), delete "moving said sleeve between its neutral position and its forward drive position and its reverse position, the improvement comprising said actuating means including an element having a first end portion adapted to".

Signed and Sealed this

Twenty-fifth Day of November, 1986

*Attest:*

DONALD J. QUIGG

*Attesting Officer*  *Commissioner of Patents and Trademarks*